United States Patent [19]

Kalinichenko et al.

[11] 4,245,292
[45] Jan. 13, 1981

[54] METHOD OF DIGITAL CONTROL OF M-PHASE THYRISTOR-PULSE D-C CONVERTERS AND APPARATUS FOR EFFECTING SAME

[76] Inventors: Anatoly Y. Kalinichenko, Orekhovo-Zuevsky proezd, 6, kv. 16; Viktor I. Kirillov, Volgogradsky prospekt, 118/7, korpus 1, kv. 47; Aron A. Rabinovich, ulitsa Lobanova, 2/21, kv. 107; Vladimir V. Maleev, Grokholsky pereulok, 30, korpus 1, kv. 97; Vagiz S. Sakaev, Fergansky proezd, 7, korpus 1, kv. 112, all of Moscow, U.S.S.R.

[21] Appl. No.: 934,052

[22] Filed: Aug. 15, 1978

[51] Int. Cl.² .................................................. H02P 13/24
[52] U.S. Cl. ........................................ 363/87; 363/129
[58] Field of Search ....................................... 363/78–79, 363/85, 87, 95–96, 128–129, 137–138; 307/232, 234, 265–267

[56] References Cited

U.S. PATENT DOCUMENTS

| | | | |
|---|---|---|---|
| 3,551,778 | 11/1968 | Ekstrom | 363/87 X |
| 3,611,097 | 10/1971 | Joslyn | 363/129 X |
| 3,671,836 | 6/1972 | Kolatorowicz et al. | 363/87 X |
| 3,914,681 | 10/1975 | Knott et al. | 363/87 X |
| 4,028,609 | 6/1977 | Detering | 363/129 |
| 4,128,869 | 12/1978 | Ermolovich et al. | 363/87 |

Primary Examiner—J. D. Miller
Assistant Examiner—Peter S. Wong
Attorney, Agent, or Firm—Lackenbach, Lilling & Siegel

[57] ABSTRACT

A method of digital control of m-phase thyristor-pulse converters, in which the duration of the conductive state of the thyristors of each phase of an m-phase thyristor-pulse converter is changed by sending time-shifted and time-constant pulse trains successively from each control channel to the thyristors of respective phases with simultaneous shift of the onset of operation of the thyristors of each phase by (1/m) period of switching the thyristors. Successive connection of each control channel to a respective phase is effected upon achieving the maximum value of the control zone of each control channel. The apparatus for carrying out the proposed method includes a master oscillator connected to a clock counter whose outputs are connected to the inputs of a decoder for decoding the time-constant pulse trains and to the logic inputs of "m" decoders for decoding the time-shifted pulse trains. The data inputs of each of the "m" decoders are connected to the data outputs of a bidirectional counter connected to a control unit, while the ouput of each of the "m" decoders is connected to one of the "m" data inputs of a matching unit whose control inputs are connected to the control outputs of the bidirectional counter. The matching unit includes "m" groups of AND gates, each group comprising "m" AND gates; the output of each AND gate of the 1-th group is connected to the 1-th control output of the bidirectional counter, while the other input of the 1-th AND gate of each group is connected to the output of the decoder for decoding the 1-th time-shifted pulse train, where $1 = 1, 2, \ldots m$ and m is the number of phases of the polyphase thyristor-pulse d-c converter.

3 Claims, 5 Drawing Figures

METHOD OF DIGITAL CONTROL OF M-PHASE THYRISTOR-PULSE D-C CONVERTERS AND APPARATUS FOR EFFECTING SAME

FIELD OF THE INVENTION

The present invention relates to automatic control systems and, more particularly, to a method of control of m-phase thyristor-pulse d-c converters and to an apparatus for effecting this method. The invention can be used in electric traction and in stationary commercial d-c electric drives.

BACKGROUND OF THE INVENTION

It is known that thyristors of thyristor-pulse converters can be controlled by applying time-constant and time-shifted trains of control pulses to the switching thyristors and main thyristors of each phase of a thyristor-pulse converter for changing the duration of the conductive state of the main thyristors. In order to reduce power current fluctuations in the power supply and load in the case of polyphase converters, it is necessary that, simultaneously with the generation of time-shifted and time-constant pulse trains, the beginning of operation of each successive phase of the thyristor-pulse converter is shifted with respect to a preceding phase by $(1/m)T$, where m is the number of phases of the converter and T is the switching period of the thyristors.

Known in the art is a method of digital control of thyristors of m-phase thyristor-pulse converters (cf. "Impulsyne preobrazovately postoyannogo toka" ("D-C Pulse Converters"), "Energia" Publishers, Moscow, 1974), in which the duration t of the conductive state of the thyristors of each phase is changed within the entire control range by sending time-shifted and time-constant pulse trains from each control channel to the corresponding phase of the m-phase thyristor-pulse converter with simultaneous shift of the beginning of operation of each phase by $(1/m)T$.

The control range $\Phi$ here and below means the time period during which is controlled the duration t of the conductive state of the thyristors or duty factor $\gamma$, which is equal to the ratio of the duration t of the conductive state of the thyristor (i.e. the pulse length) to the switching period T $$\gamma = t/T$$

The maximum control range is equal to $0 \leq \Phi \leq T$. The time-shifted and time-constant pulse trains are formed by changing the state of the flip-flops of each control channel. In this case, each control channel changes the duration t of the conductive state of the thyristors of one phase within the entire control range, thus repeating the process of shaping a pulse of the same length by each control channel with a time shift of $(1/m)T$. Each control channel provides control of the pulse duration t in the control zone $\phi$, which is the time during the pulse duration is controlled by one channel. In the known method, the control zone $\phi$ of each control channel is equal to the control range $\Phi$. In this method of control, it is necessary to provide for all combinations of states of the flip-flops in each channel.

One of the known devices for digital control of thyristors of m-phase thyristor-pulse d-c converters for carrying out the present method (cf. USSR Inventor's Certificate No. 424,290, 1971) includes a master oscillator connected to the input of a clock pulse count unit comprising "m" clock counters. The logic outputs of the clock pulse counting unit are connected to the logic inputs of each of "m" decoders of shifted pulse trains whose data inputs are connected to the data outputs of a switching unit. The switching unit includes "m" bidirectional counters, while its control inputs are connected to the control outputs of the control unit. A combination of a clock pulse counter, a decoder and bidirectional counter forms a control channel.

In the known device, the decoders, clock and bidirectional counters of each control channel must provide a train of pulses within the entire control range, i.e., to provide all combinations of states of the elements and circuits, which results in a high amount of elements of the decoders, clock and bidirectional counters and, therefore, reduces the reliability and efficiency of the control device, increases the consumed power and overall dimensions thereof.

SUMMARY OF THE INVENTION

An object of the present invention is to provide a method of digital control of thyristors of m-phase thyristor-pulse d-c converters and an apparatus for carrying out this method, ensuring higher reliability and efficiency and reducing the consumed power and overall dimensions.

Another object of the invention is to provide a method of digital control of m-phase thyristor-pulse d-c converters, in which each control channel would provide control of the duty factor $\gamma$ within $1/m$ of the control range $\Phi$.

Still another object of the invention is to provide an apparatus for carrying out above method, in which each decoder for time-shifted trains of pulses would provide isolation of a single pulse from the corresponding train of $(2n-1)/m$ pulses shifted in time by $(1/m)T$ with respect to one another and which is provided with a matching unit ensuring a respective connection of the control channels to the phases of the m-phase thyristor-pulse converter.

Yet another object of the invention is to provide a device in which each channel has an output of a time-shifted pulse train and an output of a time-constant pulse train, while the clock pulse counting unit, the switching unit and the decoders for time-shifted pulse trains have a lower number of components than the known device.

These objects are attained by a method of digital control of thyristors of m-phase thyristor-pulse d-c converters, in which the duration of the conductive state of each phase of the m-phase thyristor-pulse converter is changed by sending trains of time-shifted and time-constant pulses from each control channel to a respective phase, simultaneously shifting the onset of operation of each phase by $1/m$ of a thyristor switching period, according to the invention, in the proce s of changing the duration of the conductive state ot the thyristor within the entire control range, each control channel is connected in succession to a respective phase of the m-phase thyristor-pulse converter upon achieving the maximum value of the control zone of each control channel.

These objects are also attained by an apparatus for digital control of m-phase thyristor-pulse converters by the proposed method, comprising a master oscillator connected to the input of a clock pulse counting unit whose outputs are connected to the logic inputs of each of "m" decoders for time-shifted pulse trains, each decoder including a decoding matrix with outputs connected to the inputs of an OR gate, while the data inputs of each decoder for time-shifted pulse trains are connected to the data outputs of a switching unit whose inputs are connected to the outputs of a control unit, according to the invention, the clock pulse counting unit includes a single clock pulse counter whose outputs are connected to the inputs of the decoder for time-constant pulse trains, the switching unit includes a single bidirectional counter, the output of each decoder for shifted trains of pulses is connected to one of "m" data inputs of the matching unit whose "m" control inputs are connected to "m" control outputs of the bidirectional counter, the matching unit includes "m" groups of AND gates, each group having "m" AND gates, the input of the l-th AND gate in each group is connected to the output of the decoder for the l-th time-shifted train of pulses, the other inputs of all AND gates in the k-th group are connected to the k-th control output of the bidirectional counter, the l-th AND gate in the first group is connected to the l-th output of "m" outputs of the matching unit, the first and m-th AND gates in the p-th group of the remaining groups are connected, respectively, to the (m−p+2)-th and (m−p+1)-th outputs of the matching unit the k-th AND gate in the m-th group is connected to the (k+1)-th output of the matching unit, the i-th AND gate in the k-th group is connected to the (m+i−k−1)-th output of the matching unit, while the j-th AND gate is connected to the (j−k+1)-th output of the matching unit, where l=1,2, . . . m; p=2,3 . . . m; k=2,3 . . . i=2,3 . . . (k−1); j=k, . . . (m−l).

The present invention improves the reliability and efficiency of control, reduces the consumed power, overall dimensions, and cost of the apparatus, and improves the control quality by minimizing the effect of the scattering of the parameters of the components whose number is reduced.

BRIEF DESCRIPTION OF THE DRAWINGS

These and other objects and advantages of the invention will be apparent from the detailed description of an embodiment thereof with reference to the accompanying drawings, in which.

DETAILED DESCRIPTION OF THE INVENTION

Figure 1:
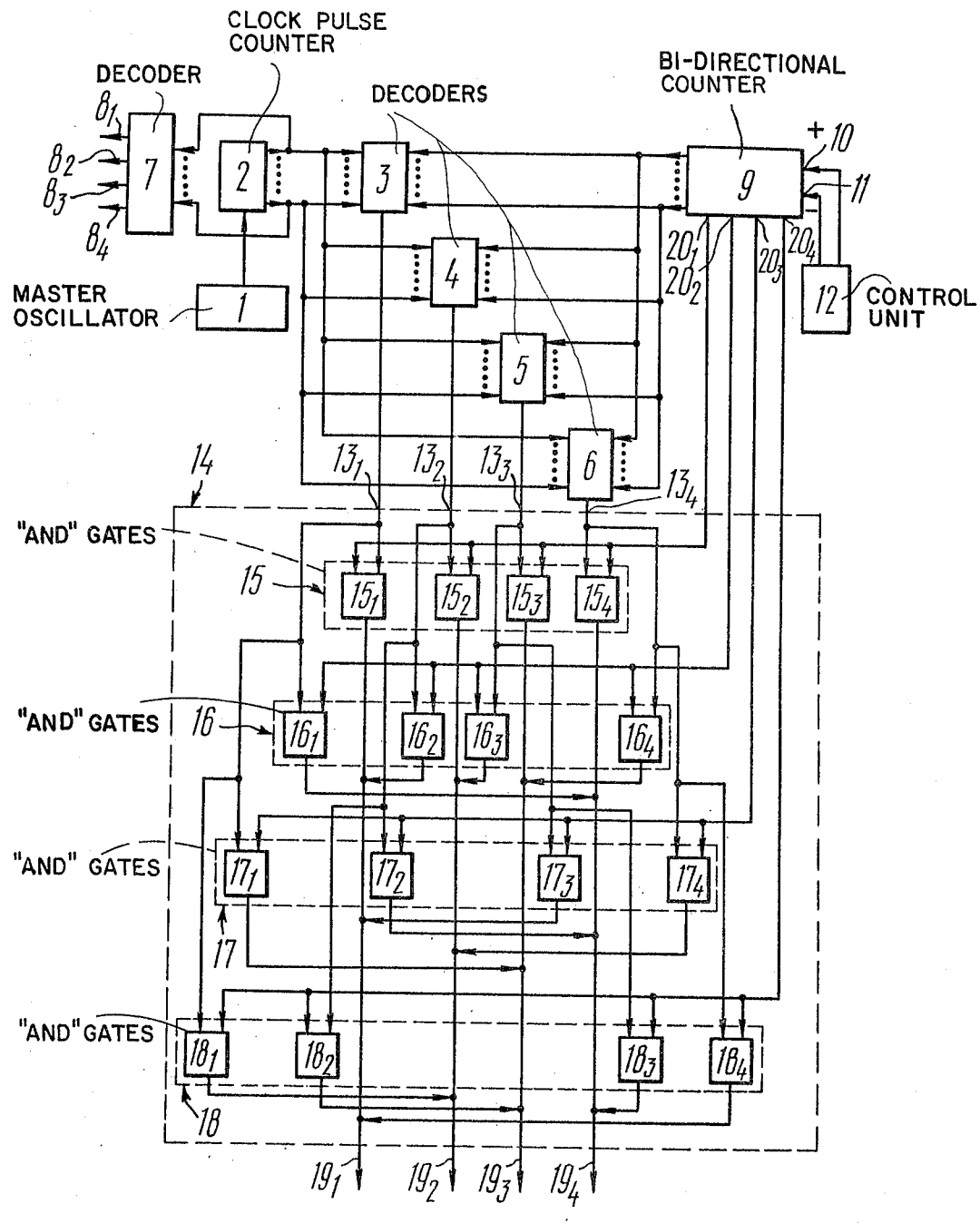
FIG. 1 is a block diagram of an apparatus for digital control of thyristors of an m-phase thyristor-pulse d-c converter, according to the invention.

FIG. 1 is a block diagram of an apparatus for digital control of an m-phase (m=4) thyristor-pulse d-c converter in which a master oscillator 1, which is a relaxation generator, is connected to a clock pulse counting unit made as a single clock counter 2. The outputs of the clock counter 2, whose number is equal to 2n (where n is the number of digits of the clock counter 2), are connected to the logic inputs of a decoder 3 for the first time-shifted pulse train, decoders 4 for the second time-shifted pulse train, a decoder 5 for the third time-shifted pulse train, and a decoder 6 for the fourth time-shifted pulse train and are also connected to the inputs of a decoder 7 for time-constant pulse trains having outputs $8_l$ to $8_m$, where m=4. The decoder 7 is used for forming a time-constant pulse train by isolating m pulses shifted with respect to one another by (1/m)T and corresponding to definite code combinations recorded in the clock counter 2. The outputs $8_1$ to $8_4$ of the decoder 7 built around a known circuit are connected to the main thyristors of respective phases of the m-phase thyristor-pulse convertor (not shown). The outputs of the bidirectional counter 9, which is used as a switching unit, are connected to the data inputs of the decoders 3, 4, 5 and 6 intended for separation of binary code combinations corresponding to the first, second, third or fourth pulse trains whose combination represents a general succession of pulses at the output of the master oscillator 1. Furthermore, the decoders 3,4,5 and 6 are used for comparison of the code combinations fed to their data and logic inputs. An add input 10 and a substract input 11 of the bidirectional counter 9 are connected to the control inputs of a control unit 12 made, for example, according to USSR Inventor's Certificate No. 310,895 granted for Patent Application No. 1,433,010/18-24, Apr. 21, 1970. The data inputs $13_l$ to $13_m$ (where m=4) of a matching unit 14 are connected, respectively, to the outputs of the decoders 3, 4, 5 and 6 for the first, second, third and fourth time-shifted pulse trains.

The combination of the master oscillator 1, clock counter 2, decoder 7 and one of the decoders 3, 4, 5, or 6 constitutes a control channel. In this case, each control channel has two outputs: the output $8_1$ of the decoder 7 for the time-constant pulse train and the output of the decoder 3 for the first time-shifted pulse train serve as outputs of the first channel, the output $8_2$ and the output of the decoder 4 for the second time-shifted pulse train serve as outputs of the second channel, while the outputs of the third and fourth channels are, respectively, the output $8_3$ and the output of the decoder 5, the output $8_4$ and the output of the decoder 6.

In order to provide for various connection of the control channels to the corresponding phases of the m-phase thyristor-pulse converter, the digital control apparatus is provided with a matching unit 14 comprising "m" groups 15, 16, 17 and 18 of AND gates, each group including "m" AND gates $15_1$–$15_4$, $16_1$–$16_4$, $17_1$–$17_4$ and $18_1$–$18_4$, respectively, where m=4.

The matching unit 14 has "m" outputs ($19_1$–$19_4$), which are connected to the switching thyristors of respective phases of the m-phase thyristor-pulse converter (not shown). "m" control inputs of the matching unit 14 are connected to the control outputs $20_1$–$20_4$ of the bidirectional counter 9.

One of the inputs of the l-th AND gate in each group is connected to the output of the decoder for the l-th time-shifted pulse train, where l=1,2, ... m. Thus, one of the inputs of the AND gates $15_l$, $16_l$, $17_l$, and $18_l$ is connected to the output of the decoder 3 for the first time-shifted pulse train, while one of the inputs of each of the AND gates $15_2$, $16_2$, $12_2$, $18_2$ one of the inputs of each of the AND gates $15_3$, $16_3$, $17_3$ and $18_3$, as well as one of the inputs of each of the AND gates $15_4$, $16_4$, $17_4$ and $18_4$ are connected to the outputs of the decoders 4, 5 and 6, respectively. The other inputs of the AND gates $15_l$–$15_4$ of the first group 15, of the AND gates $16_1$-$16_4$ of the second group 16, of the AND gates $17_1$-$17_4$ of the third group 17, and of the AND gates $18_1$-$18_4$ of the fourth group 18 are connected, respectively, to the first, second, third and fourth control outputs $20_1$-$20_4$ of the bidirectional counter 9.

In the first group 15 the l-th AND gate $15_l$ (l=1,2,...m) is connected to the l-th output $19_l$ of the matching unit 14. The total number of outputs 19 of the matching unit 14 is equal to "m", i.e., four in this case. The output of the first AND gate $16_1$, $17_1$ and $18_1$ in the p-th of the remaining groups 16, 17 and 18 (p=2,3, ... m) is the (m−p+2)-th output $19(m-p+2)$ of the matching unit 14. Therefore, the AND gate $16_1$ of the second group 16 is connected to the fourth output $19_4$ of the matching unit 14, the AND gate $17_1$ of the third group 17 is connected to the third output $19_3$, while the AND gate $18_1$ of the fourth group 18 is connected to the second output $19_2$.

In the p-th group of the remaining groups 16, 17 and 18 the m-th, i.e., the fourth AND gates $16_4$, $17_4$, $18_4$ are connected to the (m−p)-th output $19_{m-p}$ of the matching unit 14, i.e., in the second group 16 the output of the AND gate $16_4$ is the third output $19_3$ of the matching unit 14, while in the third group 17 and in the fourth group 18 the outputs of the AND gates $17_4$ and $18_4$ are outputs $19_2$ and $19_1$ of the matching unit 14.

Furthermore, in the second group 16 the outputs of the AND gates $16_2$ and $16_3$ are outputs $19_1$ and $19_2$ of the matching unit 14, while in the third group 17 the outputs of the AND gates $17_2$ and $17_3$ are outputs $19_1$ and $19_4$ of the matching unit 14.

The output of the m-th AND gate in the p-th group of the (m−p+I)-th output of the unit 14, in the m-th group the output of the k-th AND gate is the (k+I)-th output of the matching unit 14, while in the k-th group the outputs of the i-th and j-th AND gates are, respectively, the (m+i−k+I)-th and (j−k+I)-th outputs of the matching unit 14, where k=2,3, ... (m−I); i=2,3, ... (m−I); j=k (k+I), ... (m=I).

Figure 2:
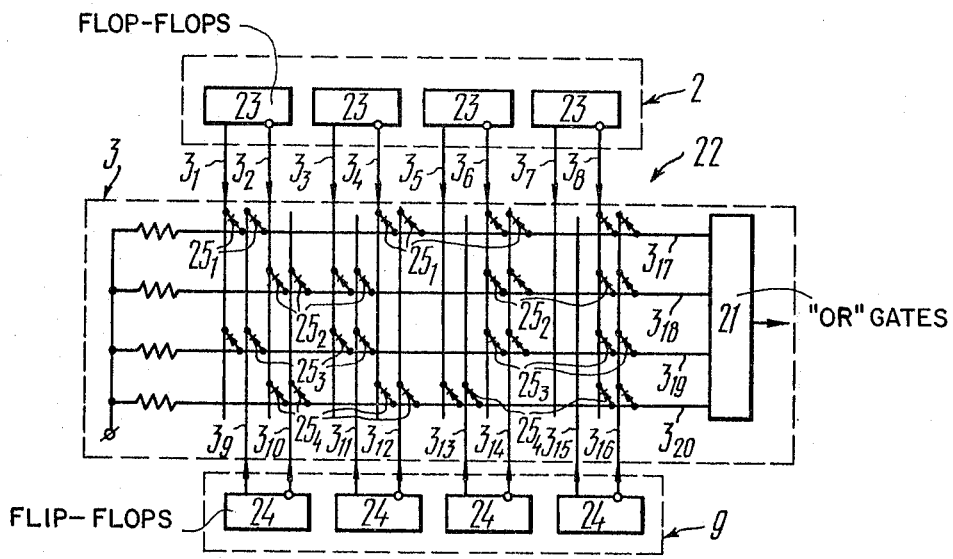
FIG. 2 is a schematic of a decoder for one time-shifted pulse train, according to the invention.

FIG. 2 is a schematic of the decoder 3 for the first time-shifted pulse train, the logic inputs whereof are connected to the outputs of the clock counter 2 and the date inputs are connected to the data outputs of the bidirectional counter 9. The decoder 3 is made in the form of an OR gate 21 whose inputs are connected to the outputs of a decoding matrix 22 made for m=4 and n=4, where n is the number of flip-flops 23 or 24 of the clock counter 2 or bidirectional counter 9, respectively. The decoding matrix 22 provides for a change in the duration t of the conductive state of the thyristor within a range $0 \leq t \leq (I/4)T$, i.e., within the control zone $\phi$.

The buses $3_1$, $3_3$, $3_5$ and $3_7$, which are conventionally called vertical buses, are connected to the unity outputs of respective flip-flops 23 of the clock counter 2, while the zero outputs of the same flip-flops 23 are connected to the vertical buses $3_2$, $3_4$, $3_6$ and $3_8$. The number of horizontal buses $3_{17}$-$3_{20}$ inserted between the power supply source "B" and the OR gate 21 is equal to $2^n/m$, i.e., four in this case, which corresponds to the four control stages of the flip-flops 23 and 24. The vertical buses $3_9$, $3_{11}$, $3_{13}$ and $3_{15}$ are connected to the unity outputs of the flip-flops 24 of the bidirectional counter 9, while the vertical buses $3_{10}$, $3_{12}$, $3_{13}$ and $3_{16}$ are connected to the zero outputs of these flip-flops 24. The horizontal bus $3_{17}$ is connected to the vertical buses $3_1$, $3_4$, $3_6$ and $3_8$ extending from the clock counter 2 and to the vertical buses $3_9$, $3_{12}$, $3_{14}$ and $3_{16}$ extending from the bidirectional counter 9, through diodes $25_1$, which corresponds to the first state written in Table I.

TABLE I

| State No. | Flip-flops 23 or 24 | | | |
|---|---|---|---|---|
| | I | II | III | IV |
| 0 | 0 | 0 | 0 | 0 |
| 1 | 1 | 0 | 0 | 0 |
| 2 | 0 | 1 | 0 | 0 |
| 3 | 1 | 1 | 0 | 0 |
| 4 | 0 | 0 | 1 | 0 |
| 5 | 1 | 0 | 1 | 0 |
| 6 | 0 | 1 | 1 | 0 |
| 7 | 1 | 1 | 1 | 0 |
| 8 | 0 | 0 | 0 | 1 |
| 9 | 1 | 0 | 0 | 1 |
| 10 | 0 | 1 | 0 | 1 |
| 11 | 1 | 1 | 0 | 1 |
| 12 | 0 | 0 | 1 | 1 |
| 13 | 1 | 0 | 1 | 1 |
| 14 | 0 | 1 | 1 | 1 |
| 15 | 1 | 1 | 1 | 1 |
| 16 | 0 | 0 | 0 | 0 |

The horizontal buses $3_{18}$, $3_{19}$ and $3_{20}$ of the decoding matrix 22 are connected to respective vertical buses (see FIG. 2) through diodes $25_2$, $25_3$ and $25_4$ in accordance with the second, third and fourth states written in Table I.

Figure 3:
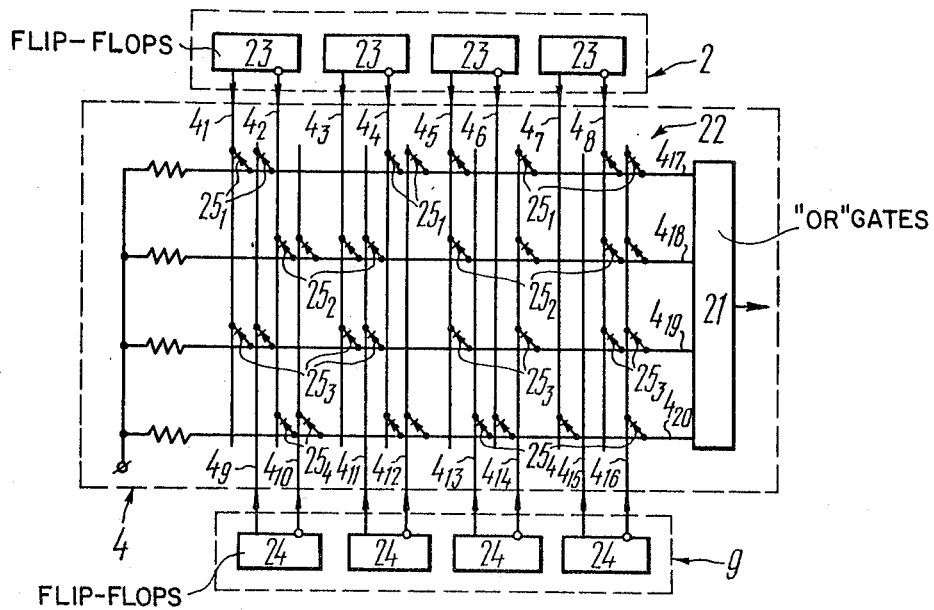
FIG. 3 is a schematic of a decoder for another time-shifted pulse train, according to the invention.

The decoder 4 for the second time-shifted pulse train, the schematic diagram of which is shown in FIG. 3, is provided, like the above-described decoder 3, with four control stages. The control zone $\phi_2$ provided by the second control channel switching on this decoder 4 is changed within $0.25\gamma \leq \phi_2 \leq 0.5\gamma$.

The vertical buses $4_9$-$4_{16}$ extending from the bidirectional counter 9 are connected to the horizontal buses $4_{17}$-$4_{20}$ through diodes $25_1$-$25_4$ like in the case of the decoder 3 (FIG. 2), i.e., in accordance with the states 1-4 of Table 1, while the vertical buses $4_1$-$4_8$ extending from the clock counter 2 are connected to the horizontal buses $4_{17}$-$4_{20}$ through the diodes $25_1$-$25_4$ in accordance with the states, 5, 6, 7, 8 of Table I.

The decoding matrices of the decoders 5 and 6 (FIG. 1) differ from the above-described decoding matrices 22 (FIG. 2 and FIG. 3) in that the vertical buses (not shown) of the decoder 5 on the side of the clock counter 2 are connected to the horizontal buses in accordance with states 9, 10, 11, 12 of Table I, while the vertical buses of the decoder 6 on the side of the clock counter 2 are connected to the horizontal buses in accordance with the states 13, 14, 15 and 16 of Table I. The vertical buses of the decoders 5 and 6 connected to the bidirectional counter 9 are connected to the horizontal buses in the same way as in the decoders 3 and 4, i.e., in accordance with the states 1, 2, 3 and 4 in Table I.

Figure 4:
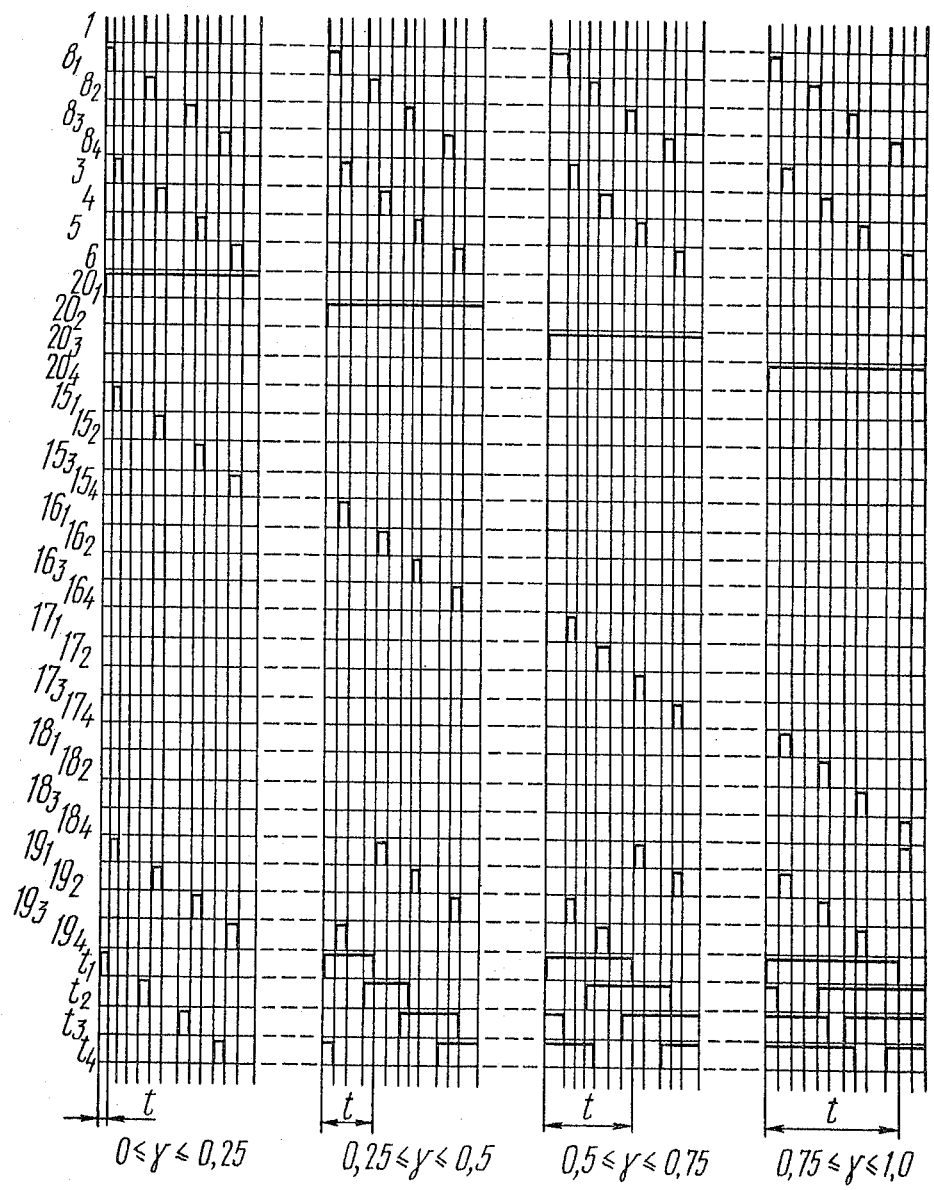
FIG. 4 represents time diagrams of the states of the elements of the apparatus according to the invention.

The proposed apparatus operates as follows. A train of clock pulses with a frequency $F = f \cdot 2^n$ (where n is the number of flip-flops 23 (FIGS. 2, 3) or 24, while f is the working frequency of the thyristors) is fed from the master oscillator I (diagram I in FIG. 4) to the input of the clock counter 2 (FIG. I) so that the states of the flip-flops 23 (FIGS. 2 and 3) of the clock counter 2 change. From the outputs of the flip-flops 23, data in the form of a binary code is fed to the logic inputs of the decoders 3, 4, 5 and 6 (FIG. I) and to the decoder 7. The decoder 7 for the time-constant pulse train separates the pulses shifted with respect to one another by $\frac{1}{4}$ T (diagrams $8_1$, $8_2$, $8_3$ and $8_4$ in FIG. 4. Here and in what follows, the number of the diagram corresponds to the position of the element in the drawings). In this case, there are separated in succession the first, $$(\frac{2^n}{4} + I)\text{-th}, (\frac{2^n}{2} + I)\text{-th and } (\frac{3}{4} 2^n + I)\text{-th}$$

pulses corresponding to the states of Table I having the same serial number and written in the flip-flops 23 of the clock counter 2 (FIG. 1). From the outputs $8_1$–$8_4$, the pulses are fed to the main thyristors of the m-phase thyristor-pulse converter.

When a control pulse is applied to the add input 10 of the bidirectional counter 9, the first flip-flop of this counter 9 changes its state, which corresponds to the binary code 1000, which is fed to the data inputs of the decoders 3, 4, 5 and 6.

The process of changing of the states of the flip-flops 23 (FIG. 3) of the clock counter 2 runs continuously and, as mentioned above, the states of the flip-flops 23 change with a frequency F. The change in the states of the flip-flops 24 of the bidirectional counter 9 occurs at a repetition frequency $F_2$. When the code combinations recorded in the clock counter 2 and bidirectional counter 9 coincide in time, pulses shifted with respect to one another by (I/4)T appear at the outputs of the first horizontal buses (FIGS. 2 and 3) of the decoding matrices 22 and, therefore, at the outputs of the decoders 3,4, 5 and 6. The pulses at the outputs of the decoders 3, 4, 5 and 6 are shifted in time by $\delta(T/2)n$ with respect to the pulses following through respective outputs $8_1$–$8_4$ of the decoder 7 (diagrams $8_1$ and 3, $8_2$ and 4, $8_3$ and 5, and $8_4$ and 6 in FIG. 4). Upon arrival of a first control pulse corresponding to the beginning of controlling the conductive state of the thyristors, a potential signal appears at the control output $20_I$ of the bidirectional counter 9 (diagram $20_I$ in FIG. 4). This signal is applied to one of the inputs of each AND gate $17_I$, $17_2$, $17_3$ and $17_4$ of the first group 17. The other input of each of the same AND gates $17_I$, $17_2$, $17_3$ and $17_4$ is fed with pulses from the outputs of the decoders 3, 4, 5 and 6 so that at the outputs $19_I$–$19_4$ of the unit 14 there appear pulses shifted in time with respect to one another by (I/4)T (see diagrams $19_1$–$19_4$ in FIG. 4).

Thus, the first connection of the four control channels is effected, each channel having two outputs (see above) connected to respective phases of the m-phase thyristor-pulse converter through the matching unit 14. The diagrams $t_I$–$t_4$ (FIG. 4) show pulses of equal length, which represent the time of the conductive state of the main thyristors.

Each of the control channels changes the duration t of the conductive state of the thyristors of respective phases within the range of $0 \leq t \leq 0.25$ T.

As control pulses are applied to the add input 10 of the bidirectional counter 9 (FIG. 1), the code combinations written in the flip-flops 24 (FIGS. 2,3) in accordance with Table I are changed. In this case, the moment of coincidence of the code combinations written in the clock counter 2 and bidirectional counter 9 is shifted in time within the control zone $\phi_1$, where the duty factor $\gamma$ is $0 \leq \gamma \leq 0.25$, while the duration t of the conductive state of the thyristors is expressed as $$t = \delta_t + t_k,$$

where $\delta_t$ is the controlled part of the pulse length, $t_k$ is the switching time of the thyristors.

The duration t is controlled by changing the component $\delta_t$, which at any instant is determined as $$\delta_t = (x-y)(T/2)n,$$

where x and y are, respectively, the number of pulses fed to the adding input 10 (in the case of increasing the period of the conductive state of the thyristor) and to the substract input 11 (in the case of decreasing the period of the conductive state of the thyristor) of the bidirectional counter 9.

Figure 5:
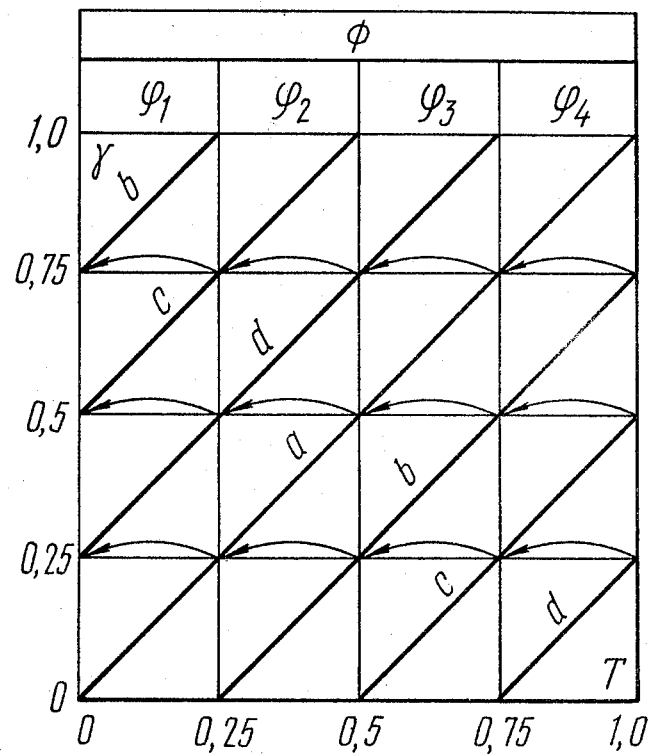
FIG. 5 is a diagram of connection of the control channel to the phases of the m-phase converter.

In this case the duty factor $\gamma$ of each phase of the m-phase converter changes in accordance with the diagram "a" shown in FIG. 5, where the diagrams "a", "b", "c" and "d" illustrate the law of the change in the duty factor $\gamma$ of the first, second, third and fourth phases, respectively. Taking into account that each control channel ensures control of the conductive state of the thyristors within the control zone $\phi_m$ all the control range $\Phi$ is subdivided into four control zones $\phi_1$, $\phi_2$, $\phi_3$ and $\phi_4$, where $\phi_1, \phi_2, \phi_3, \phi_4$ are the control zones of the first, second, third and fourth control channels, respectively.

When the $(2^n/4)$-th control pulse is applied to the add input 10 and when the duty factor $\gamma$ reaches 0.25, which is maximum for the first control channel, the control voltage across the output $20_1$ (FIG. 1) of the bidirectional counter is removed and a d-c voltage of the same level appears across the control output $20_2$ (diagrams $20_1$ and $20_2$ in FIG. 4), while the bidirectional counter 9 is reset to its initial position. The constant-level signal from the control output $20_2$ is fed to one of the inputs of each of the AND gates $18_1$–$18_4$ of the second group 18. As mentioned above, the other input of each of these AND gates $18_1$–$18_4$ receives pulses from the decoders 3, 4, 5 and 6, i.e., from one of the outputs of each control channel. As a result, pulses also appear at the outputs $19_1$–$19_4$ of the matching unit 14, but the order of transmission of pulses from the outputs of the decoders 3–6 to the outputs $19_1$–$19_4$ of the matching unit 14 differs from that described above, namely: the pulses from the outputs of the decoders 3, 4, 5 and 6 are fed to the outputs $19_4$, $19_2$, $19_3$, $19_1$, respectively (diagrams in FIG. 4 for $0.25 \leq \gamma \leq 0.5$). In this case, the magnitude of the duty factor $\gamma$ is changed from 0.25 to 0.5, since the instant of coincidence of the code combinations recorded in the clock counter 2 and bidirectional counter 9 is changed. On achieving the maximum duty factor $\gamma$ equal to 0.5 for the given control zone (FIG. 5), the bidirectional counter is reset as described above, a potential signal appears at the output $20_3$ while this signal disappears at the output $20_2$. After that, the process of connection of the control channels through the matching unit 14 to the phases of the m-phase thyristor-pulse d-c converter takes place similarly to those described above. Thus, in the control zone $\phi_3$ (for duty factors $0.5 \leq \gamma \leq 0.75$) the pulses from the outputs of the decoders 3, 4, 5 and 6 are fed to the outputs $19_2$, $19_3$, $19_4$ and $19_1$ of the unit 14, respectively. Within the control zone $\phi_4$ (the duty factor $0.75 \leq \gamma \leq 1.0$) the pulses from the outputs of the decoders 3, 4, 5 and 6 are fed to the outputs $19_2$, $19_3$, $19_4$ and $19_1$ of the unit 14, respectively. The process of change in the duration of the conductive state of the thyristors is shown in the diagrams $t_1$–$t_4$ of FIG. 4, where $t_1$, $t_2$, $t_3$ and $t_4$ are respectively the durations of the conductive state of the thyristors of the first, second, third and fourth phases of the m-phase thyristor-pulse converter.

In order to reduce the duration t of the pulse (for reducing the duty factor γ), the control pulses from the control unit 12 (FIG. 1) are fed to the substract input 11 of the bidirectional counter 9. In this case, the supply of each next control pulse reduces the duration of the conductive state of the thyristors by a value $\delta_t$.

The use of the decoder 7 for time-constant pulse trains makes it possible to obtain "m" time-constant pulse trains by means of a single clock pulse counter 2, while making of the decoders 3, 4, 5, 6 for time-shifted pulse trains according to the specification makes it possible to provide control of the duty factor γ of all phases using only one clock counter 2 and one bidirectional counter 9; furthermore, such connection of the decoders 3, 4, 5 and 6 requires 1/m times less components, i.e. the efficiency of the proposed apparatus increases with a decrease in the number of phases.

Thus, in the proposed method the decoding matrices 22 (FIG. 2) of the decoders 3, 4, 5 and 6 for time-shifted pulse trains are set up only for controlling the duty factor γ and only within a certain control zone, i.e., generally from "0" to (1/m)γ, and not for providing control within the whole range from "0" to 1.0γ. This reduces a required amount of components, therefore, increases the reliability and efficiency and decreases the consumed power and overall dimensions of the system.

The present specification is applied to discrete elements (diodes), however, the proposed method and apparatus can be applied to integrated circuits with all the advantages mentioned above.

What is claimed is:

1. A method of digital control of thyristors of m-phase thyristor-pulse d-c converters, comprising:
generating time-shifted and time-constant pulse trains in each of "m" control channels within the control zone of each control channel;
successively connecting each of said control channels to said thyristors of a respective phase of said m-phase thyristor-pulse converter upon achieving the maximum limit of the control zone for each of said control channels within the entire control zone; and
changing the duration of the conductive state of said thyristors by feeding them with said pulse trains from each control channel, while simultaneously shifting the onset of operation of each said phase of said m-phase thyristor-pulse d-c converter by (1/m)T, where m is the number of phases of the thyristor-pulse d-c converter and T is the switching period of said thyristors.

2. An apparatus for digital control of m-phase thyristor-pulse converters, comprising;
a master oscillator;
a clock pulse counting unit including a single clock counter;
a decoder for decoding time-constant pulse trains;
decoders for decoding tim-shifted pulse trains, each decoder having logic inputs and data inputs;
a decoder for decoding the l-th time-shifted pulse train,
each of said decoders for decoding the l-th time-shifted pulse train including a decoding matrix whose inputs are connected to the inputs of an OR gate;
a switching unit made as a bidirectional counter having an add input, a substract input, data outputs, control outputs, and
an l-th control output;
a control unit whose outputs are connected to said add and substract inputs of said bidirectional counter,
said data outputs of said switching unit being connected to said data inputs of each of the decoders of the l-th time-shifted pulse train,
said logic inputs of each of the decoders for decoding said l-th time-shifted pulse train being connected to the inputs of said decoder for decoding time-constant pulse trains,
an output of said master oscillator being connected to the input of said clock counter;
a control device also including a matching unit comprising: "m" groups of AND gates with "m" AND gates in each group;
a first group of AND gates;
l-th, m-th, p-th, k-th groups of AND gates;
a first AND gate in each of said groups of AND gates and m-th, l-th, k-th, i-th, and j-th AND gates in each of said groups,
an input of said l-th AND gate in each of said groups being connected to the output of said decoder for decoding the l-th time-shifted pulse trains,
each of said AND gates of said l-th group being connected to the l-th output of said control outputs of said bidirectional counter,
said matching unit having "m" outputs, including an l-th output,
an (m−p+2)-th output, an (m−p+/1)-th output, a (k+l)-th output, an (m+i−k+1)-th output, and a (j−k+1)-th output,
an output of said l-th AND gate in said first group serving as said l-th output of said matching unit,
an output of said first AND gate in said p-th group serving as said (m−p+2)-th output of said matching unit,
an output of said m-th AND gate in said p-th group serving as said (m−p+1)-th output of said matching unit,
an output of said k-th AND gate in said m-th group serving as said (k+l)-th output of said matching unit, and
outputs of said i-th and j-th AND gates in said k-th group serving, respectively, as said (m+1−k+1)-th and (j−k+1)-th outputs of said matching unit, where l=1,2, ... m, p=2,3 ... m, k=2,3, ... (m−1), i=2,3, ... k−1, j=k, ... k+1, ... m−1.

3. A method for controlling thyristors of m-phase thyristor-pulse d.c. converters, wherein the duration of the conductive state of the thyristors in each phase of the m-phase thyristor-pulse converter is changed by an identical amount within the thyristor switching period (T) comprising the steps of supplying some of the thyristors with trains of time-shifted pulses and other thyristors with trains of time-constant pulses shaped in each of the control channels, and simultaneou ly shifting the beginning of operation of the thyristors in eac phase by 1/m T relative to each other, and successively connecting each channel where the time-shifted trains of pulses are shaped to the respective phases of the converter as the duration of the conductive state of thyristors in each phase changes within the entire control range after the duration of the conductive state of the thyristors has reached a level equal to 1/m T, a corresponding level of the channel control zone.

* * * * *